United States Patent
Kummer et al.

[11] Patent Number: 6,129,191
[45] Date of Patent: Oct. 10, 2000

[54] FRICTION CLUTCH WITH IMPELLER FAN FEATURE FOR PRESSURE PLATE COOLING

[75] Inventors: Martin E. Kummer; Daniel V. Gochenour, both of Auburn, Ind.

[73] Assignee: Eaton Corporation, Cleveland, Ohio

[21] Appl. No.: 09/353,322

[22] Filed: Jul. 14, 1999

[51] Int. Cl.⁷ ..................................................... F16D 13/72
[52] U.S. Cl. .................................. 192/70.12; 192/113.23
[58] Field of Search ............................. 192/70.12, 70.25, 192/113.23, 111 A

[56] References Cited

U.S. PATENT DOCUMENTS

| | | | |
|---|---|---|---|
| 2,870,893 | 1/1959 | Palm | 192/70.12 X |
| 4,529,074 | 7/1985 | Alas | 192/70.12 |
| 4,576,266 | 3/1986 | Schilling et al. | 192/70.12 |
| 4,667,794 | 5/1987 | Martinez-Corral et al. | 192/70.12 |
| 5,421,438 | 6/1995 | Flotow et al. | |
| 5,690,203 | 11/1997 | Link et al. | 192/70.25 |
| 5,857,547 | 1/1999 | Dequesnes | 192/70.12 |
| 5,896,971 | 4/1999 | Hein | 192/113.23 X |
| 5,944,157 | 8/1999 | Blard et al. | 192/70.12 |

*Primary Examiner*—Rodney H. Bonck
*Attorney, Agent, or Firm*—Dykema Gossett PLLC

[57] ABSTRACT

A friction clutch for a motor vehicle includes a cover, a pressure plate, a biasing member and an adjustment mechanism. The adjustment mechanism includes a first annular cam, a second annular cam and a torsional spring and housing assembly. The cover has an axis of rotation. The pressure plate is coupled to the cover for rotation therewith about the axis. The pressure plate has a frictional engagement surface substantially normal to the axis. The pressure plate has a plurality of cooling blades extending from the pressure plate on a side opposite the frictional engagement surface. The blades are located at a first radial distance from the axis. The biasing member is interposed between the cover and the pressure plate, and biases the pressure plate toward an engaged pressure plate position. The adjustment mechanism is centered about the axis and is located at a first radial distance from the axis. The adjustment mechanism is operably disposed between the biasing member and the pressure plate. The first annular cam is rotatably fixed with respect to the pressure plate. The second annular cam is rotatable relative to the first annular cam. Both cams have a plurality of mutually engaged cam surfaces configured such that rotation of the second cam relative to the first cam in a first direct increases a height of the adjustment mechanism. The torsional spring and housing assembly is operably disposed between the first annular cam and the second annular cam, and includes a torsional spring and a housing. The housing receives the torsional spring. The housing has a flange. The flange is disposed over the blades of the pressure plate, thereby defining radially extending air flow channels. The pressure plate and the housing together define an impeller fan which forces air radially outwardly past the pressure plate with rotation of the pressure plate about the axis.

10 Claims, 3 Drawing Sheets

FRICTION CLUTCH WITH IMPELLER FAN FEATURE FOR PRESSURE PLATE COOLING

FIELD OF THE INVENTION

This invention relates to the field of friction clutches, and more particularly to friction clutches having clutch cooling features.

BACKGROUND OF THE INVENTION

Known friction clutches provide a releasable torsional connection between a motor vehicle engine flywheel and an associated transmission. Repeated clutch disengagement and engagement cycles wear the friction material of the clutch driven disc. If the clutch is allowed to slip excessively, or is abused, an undesirable amount of heat may be generated heat within the clutch. The heat has the potential to affect the engagement characteristics of the clutch and also to increase the wear rate of the friction material. Excess heat build-up in the pressure plate can result in a deterioration in clutch performance. Excess heat is preferably absorbed and dissipated by the clutch. Some clutch pressure plates have cooling fins to facilitate the dissipation of heat in the pressure plate. However, in some cases, the cooling fins are inadequate to dissipate the heat rapidly enough. The cooling fins may also be unable to sufficiently reduce variations in thermal distribution throughout the pressure plate to reduce the generation of thermal stress.

The above mentioned wear of friction material is also a concern. As the friction material wears, the clutch clamping load generated by a spring acting directly or indirectly against the pressure plate tends to decrease. Clutches are commonly provided with adjustment mechanisms to compensate for wear of the friction material and the attendant loss of clamping load. However, adjustment mechanisms, particularly certain types of automatic adjustment mechanisms, occupy or interfere with the location of cooling fins on the pressure plate. Therefore, clutches are generally equipped with cooling fins or with an automatic adjustment mechanism, but not both.

It is desired to provide a means of cooling the clutch pressure plate which is both effective at cooling the pressure plate and will accommodate an automatic adjustment mechanism.

It is also desired to provide a feature on the pressure plate which dissipates heat from a pressure plate more effectively than cooling fins.

SUMMARY OF THE INVENTION

A friction clutch for a motor vehicle includes a cover, a pressure plate, a biasing member and an adjustment mechanism. The adjustment mechanism includes a first annular cam, a second annular cam and a torsional spring and housing assembly. The cover has an axis of rotation. The pressure plate is coupled to the cover for rotation therewith about the axis. The pressure plate has a frictional engagement surface substantially normal to the axis. The pressure plate has a plurality of cooling blades extending from the pressure plate on a side opposite the frictional engagement surface. The blades are located at a first radial distance from the axis. The biasing member is interposed between the cover and the pressure plate, and biases the pressure plate toward an engaged pressure plate position. The adjustment mechanism is centered about the axis and is located at a first radial distance from the axis. The adjustment mechanism is operably disposed between the biasing member and the pressure plate. The first annular cam is rotatably fixed with respect to the pressure plate. The second annular cam is rotatable relative to the first annular cam. Both cams have a plurality of mutually engaged cam surfaces configured such that rotation of the second cam relative to the first cam in a first direct increases a height of the adjustment mechanism. The torsional spring and housing assembly is operably disposed between the first annular cam and the second annular cam, and includes a torsional spring and a housing. The housing receives the torsional spring. The housing has a flange. The flange is disposed over the blades of the pressure plate, thereby defining radially extending air flow channels. The pressure plate and the housing together define an impeller fan which forces air radially outwardly past the pressure plate with rotation of the pressure plate about the axis.

A clutch pressure plate includes an annular pressure plate body, a frictional engagement surface, a plurality of cooling blades, and a plurality of plateau surfaces. The annular pressure plate body is centered on an axis of rotation. The frictional engagement surface is substantially normal to the axis. The plurality of cooling blades axially extends from the pressure plate on a side opposite the frictional engagement surface, and radially extends outwardly from inner tips located at a first radial distance from the axis. The blades are formed integral and unitary with the body. The plateau surfaces are disposed on the blades and are axially spaced from the pressure plate body.

The disclosed clutch provides a means of cooling the clutch pressure plate which is both effective at cooling the pressure plate and will accommodate an automatic adjustment mechanism.

The disclosed pressure plate provides a feature which dissipates heat from a pressure plate more effectively than cooling fins.

DESCRIPTION OF PREFERRED EMBODIMENTS

Figure 1:
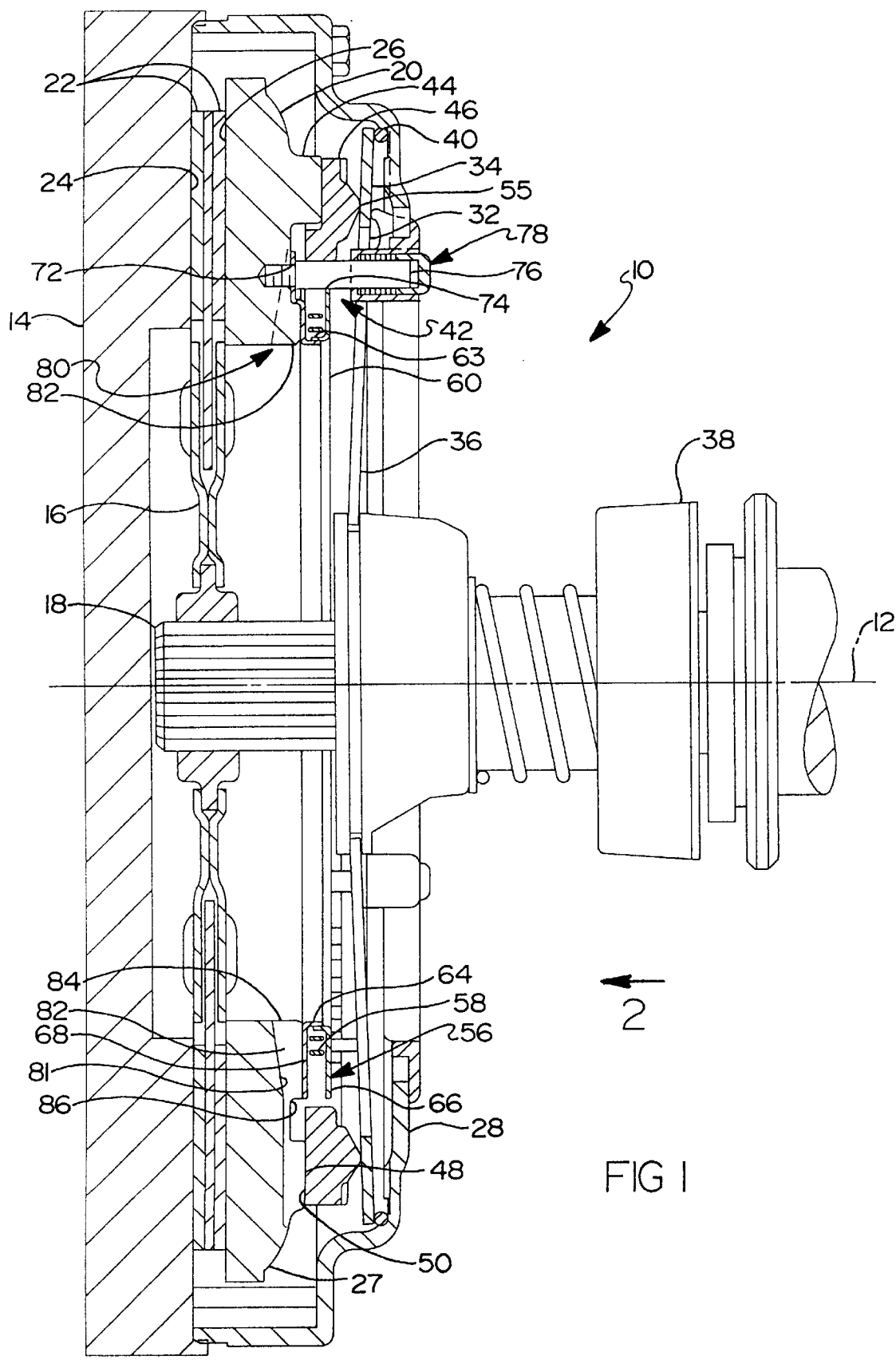
FIG. 1 is a sectional side view of a clutch.
Figures 3, 4, 5:
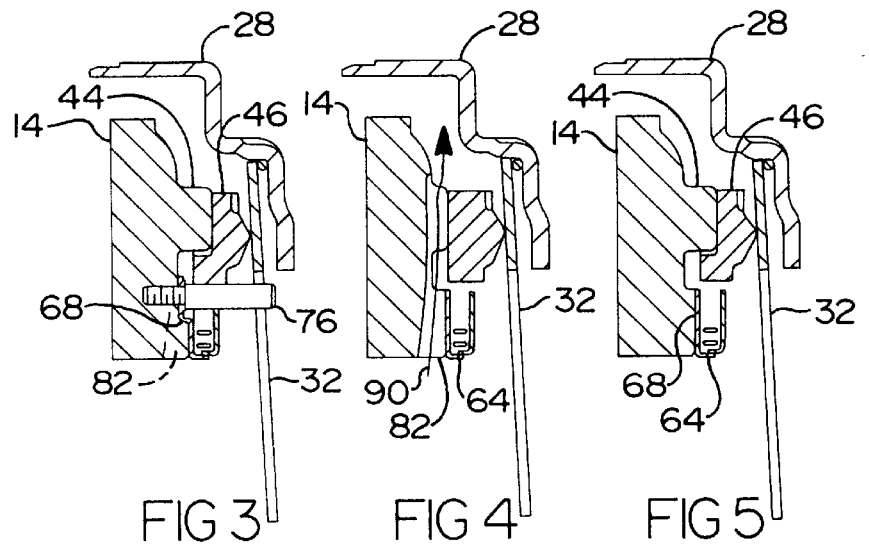
FIG. 3 is a broken-out sectional view of the clutch in the direction of arrows 3 in FIG. 2.
FIG. 4 is a broken-out sectional view of the clutch in the direction of arrows 4 in FIG. 2.
FIG. 5 is a broken-out sectional view of the clutch in the direction of arrows 5 in FIG. 2.

A frictional clutch 10 for a motor vehicle is shown in FIG. 1. Clutch 10 rotates about an axis 12. A flywheel 14 is rotatably fixed to a crankshaft of a motor vehicle engine (not shown). A driven disc 16, centered with respect to axis 12, has a splined hub which slidably engages a splined input shaft 18. Driven disc 16 is sandwiched between flywheel 14 and a pressure plate 20. Driven disc 16 has friction elements 22 which are engaged by flywheel engagement surface 24 and pressure plate engagement surface 26 when clutch 10 is in an engaged condition. Pressure plate 20 is comprised in large part of an annular pressure plate body 27, on one side of which is engagement surface 26.

Figure 7:
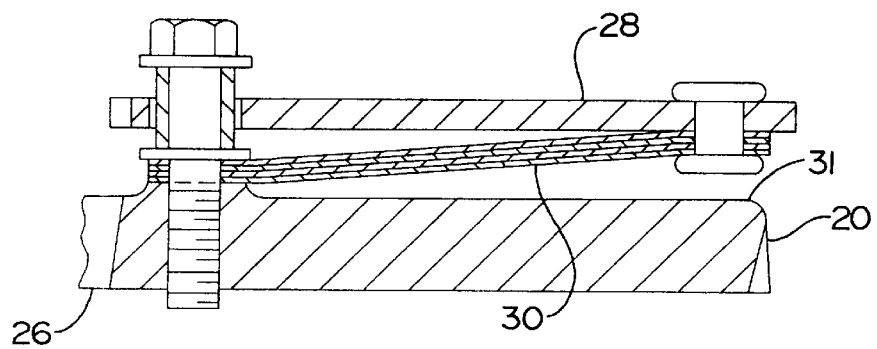
FIG. 7 is a broken-out sectional view of a connection between the pressure plate and the clutch cover.

A cover 28 is disposed over pressure plate 20 and is fixed to flywheel 14. A plurality of straps 30 circumferentially extend between cover 28 and a radially extending flange 31 of pressure plate 20 as shown in FIG. 7. Straps 30 rotatably fix pressure plate 20 to cover 28 while allowing relative axial displacement of pressure plate 20 to cover 28.

A diaphragm spring 32 is axially disposed between cover 28 and pressure plate 20. An annular portion 34 of diaphragm spring 32 biases pressure plate 20 toward flywheel 14, clamping driven disc 16 therebetween to rotatably connect or lock input shaft 18 with flywheel 14 when clutch 10 is in an engaged position. Diaphragm spring 32 has a plurality of radially inwardly extending spring fingers or levers 36, the radially inner tips of which are engaged by an axially displaceable release assembly 38. A pivot ring 40 is axially disposed between an outer diameter of annular portion 34 and cover 28. Ring 40 facilitates the pivoting or flexing of annular portion 34 relative to cover 28.

Clutch 10 is selectively released or disengaged by axially displacing release assembly 38 along axis 12 in a direction away from flywheel 14. Such displacement is achieved by a vehicle operator through a pedal operated clutch linkage (not shown). As the radially inner tips of fingers 36 are axially displaced away from flywheel 14, fingers 36 bow causing annular portion 34 to deflect, thereby relieving the clamping load against pressure plate 20, and permitting rotation of input shaft 18 relative to flywheel 14.

Alternatively, a clutch could employ, in place of diaphragm spring 32 having fingers 36, a plurality of compressive coil springs acting against a plurality of radially oriented levers which in turn engage pressure plate 20. With compressive coil or angle springs, the spring load is commonly applied to a radially inner end of the levers. The levers are pivotally supported at the radially outer ends. Clutches may yet alternatively employ an annular diaphragm type spring in place of coil springs to bias the levers.

An adjustment mechanism 42 is disposed between pressure plate 20 and diaphragm spring 32 at a location radially inwardly of pivot ring 40. Adjustment mechanism 42 is used to compensate for wear of friction elements 22.

The adjustment mechanism 42 comprises, in its most basic elements, first and second relatively rotatable annular cams and a spring. The spring induces relative rotation between the cams. In the embodiment of FIG. 1, a first cam 44 is stationary or non-rotatable relative to cover 28 and pressure plate 20. Although first cam 44 is shown formed as a single integral unitary piece with pressure plate 20, it could instead be formed as a separate annular ring, or a plurality of cam segments. Second or rotatable cam 46 is annular in shape and can be formed of any adequately rigid material, including steel and plastic. First cam 44 and second cam 46 have first cam surfaces 48 and second cam surfaces 50 respectively in engagement with each other. First cam surfaces 48 are defined by wedges 52 formed integral with pressure plate 20, best shown in FIG. 6. Wedges 52 have circumferential gaps 54 therebetween. Both first cam 44 and second cam 46 are concentric with axis 12.

An effective pressure plate thickness from engagement surface 26 to a fulcrum 55 of second cam 46 is controlled by the relative rotative position of second cam 46 relative to first cam 44. It should be appreciated that the rotatable cam could be disposed against pressure plate 20 and retained by a groove or the like, and the stationary cam disposed against diaphragm spring 32. Additionally, diaphragm spring 32 need not engage either of the cams directly, as a second pivot ring could be used to define the fulcrum.

Figure 6:
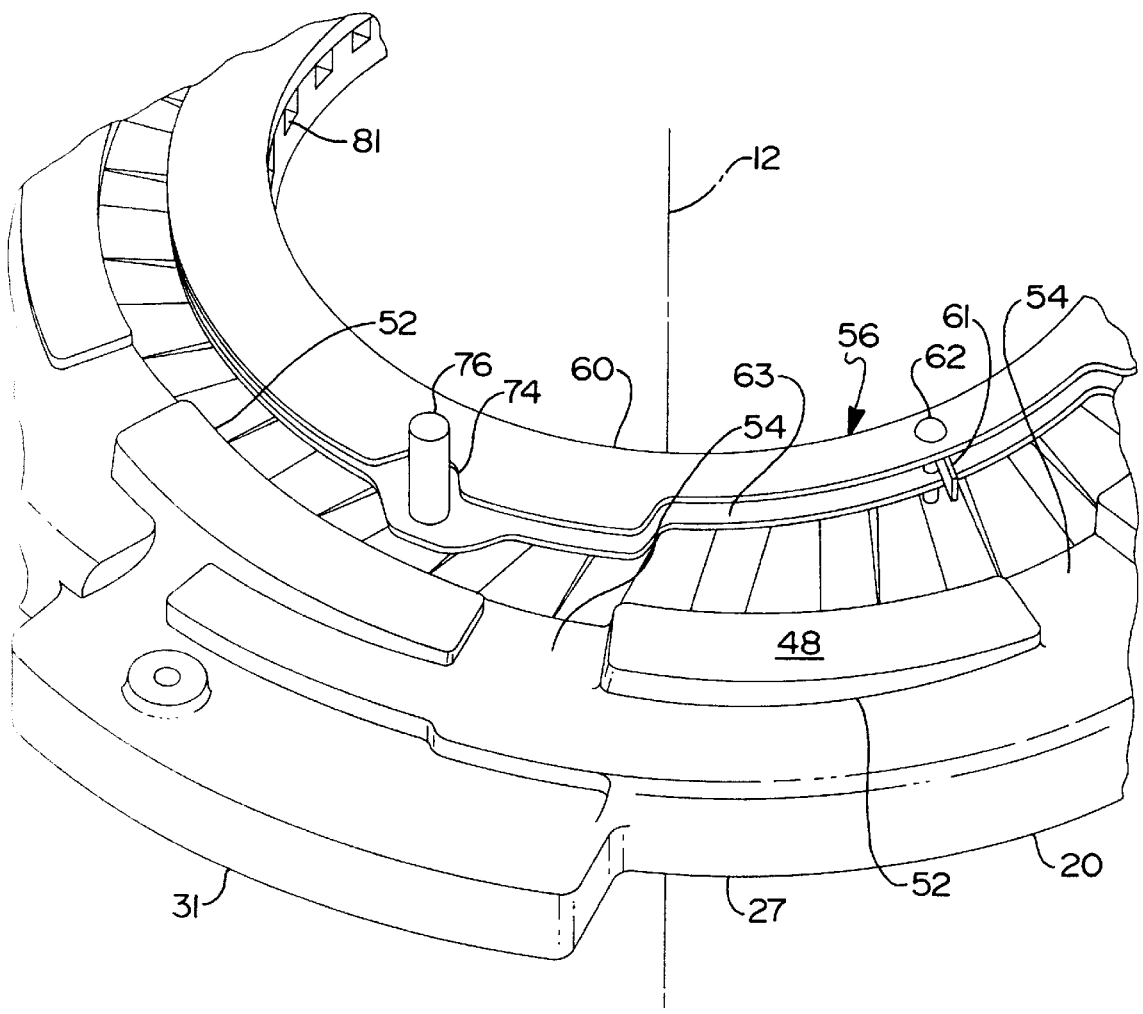
FIG. 6 is a broken-out perspective view of the pressure plate and a torsional spring and housing assembly.

A torsional spring and housing assembly 56 is fixed to pressure plate 20. Assembly 56 includes a cam spring 58 and a cam spring housing 60 which carries spring 58 as best shown in FIGS. 1 and 6.

Cam spring 58 is a flat wire spring wound over itself within housing 60. Cam spring 58 has a first or outer end 61 which, when clutch 10 is fully assembled, engages a spring hook (not shown) of second cam 54. Prior to assembly, first end 61 is engaged by a retaining pin 62. A second or inner end of cam spring 58 is received by a slot in cam spring housing 60. As drive disc 26 wears, spring 58 unwinds, biasing cam 54 to a position of increased effective pressure plate thickness.

Housing 60 defines a channel 63 therein which guides cam spring 58. Housing 60 has an inner diameter portion 64 and first and second flange portions 66 and 68 respectively, extending radially outwardly from inner diameter portion 64 to define channel 63. The slot or window which receives and retains the second end of spring 58 is disposed in inner diameter portion 64.

Retaining pin 62 passes through aligned pin apertures in first flange portion 66 and second flange portion 68. Retaining pin 62 is engaged by first end 61 of spring 58 as best shown in FIG. 6. Three mounting apertures 72 are provided in second flange portion 68. Apertures 72 are positioned for alignment with corresponding apertures on pressure plate 20. Clearance notches 74 are provided in first flange portion 66 to accommodate the receipt by apertures 72 of housing to pressure plate fastening means, such as adjustment limiting pins 76. Threaded ends of pins 76 are passed through apertures 72 and threaded into threaded apertures in pressure plate 20. A shank portion or pins 76 seats against second flange portion 68. Adjustment limiting pins 76 comprise one part of an adjustment limiting mechanism 78 which prevents adjustment mechanism 42 from adjusting excessively.

Figure 2:
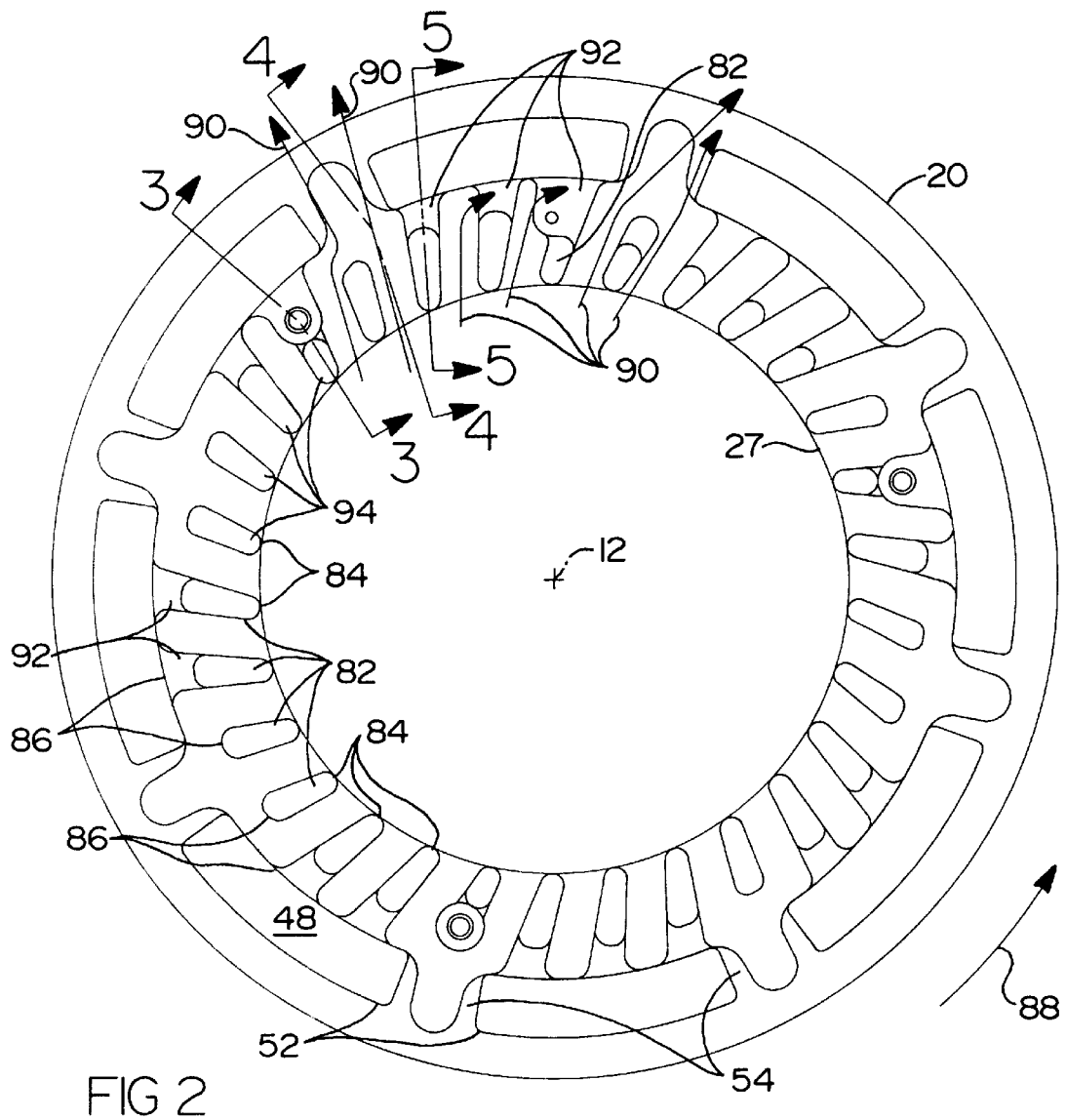
FIG. 2 is an end view of the pressure plate of the clutch of FIG. 1 in the direction of arrow 2.

A centrifugal impeller fan 80 and associated air flow channels are defined by second flange portion 68, pressure plate 20 and a plurality of blades 82 extending between the pressure plate 20 and second flange portion 68. Blades 82 are formed integral and unitary with pressure plate 20. Blades extend axially from a side of pressure plate 20 opposite engagement surface 26, and extend radially from inner tips 84 to outer tips 86. Outer tips 86 are circumferentially offset from inner tips 84 such that blades are at a backwards angle relative to the direction of rotation as best shown in FIG. 2. Pressure plate 20 is shown without flanges 31 in FIG. 2. Pressure plate 20 rotates in the direction of arrow 88. The backwards angle or backwards incline provides an impeller which is advantageously relatively efficient compared with alternative blade orientations and which provides relatively large quantities of airflow at moderate pressures.

Blades 82 define therebetween air flow paths 90 accommodating the flow of air from a radially inner area of clutch 10 to a radially outer area of clutch 10. Reduced height portions or notches 92 are formed in blades 82 proximate to wedges 52. Notches provide paths 90 for air to pass around cam wedges 52 and through gaps 54. As an alternative to notches 92, blades 82 may be formed so as to not extend completely to wedges 52, thereby defining the necessary air flow passages 90 around wedges. Each of blades 82 have a plateau portion 94. Plateau portions 94 are flat and are parallel to engagement surface 26. Plateau portions 94 are engaged by second flange portion 68 to close one side of channels 81.

Air flow channels 81 are characterized by a substantially rectangular cross sectional shape, as best shown in FIG. 6, where the inner ends of channels 81 can be seen. Inner diameter portion 64 is of approximately the same diameter as an inner diameter of pressure plate 20, with channels 81 resultantly being closed on all sides at their inner ends. While air flow channels 81 are closed on all sides, they are open on their inner ends and outer ends.

One of the advantages of a centrifugal impeller fan 80 over cooling fins is that the impeller fan 80 forces more air across pressure plate 20, and is therefore more effective at cooling pressure plate 20, than mere cooling fins. It should be appreciated that the use of second flange portion to close one side of channels not only provides the benefits associated with a centrifugal impeller fan, but it does so while accommodating automatic adjustment mechanism 42.

It should be appreciated that there are readily apparent alternative embodiments to the above described clutch configurations. For example, a torsional biasing cam spring having a round instead of a flat cross section or even a coil extension spring may be used. Or, the cam spring housing may be modified to have just a single flange portion with first flange portion being eliminated. Further, the described centrifugal impeller fan may be employed with clutches having different configurations, including angle spring clutches or clutches in which the adjusting mechanisms is disposed against the cover instead of against the pressure plate. Additionally, the locations of the rotating cam and the stationary cam may be transposed.

The embodiments disclosed herein have been discussed for the purpose of familiarizing the reader with the novel aspects of the invention. Although preferred embodiments of the invention have been shown and disclosed, many changes, modifications and substitutions may be made by one having ordinarily skill in the art without necessarily departing from the spirit and scope of the invention as described in the following claims.

What is claimed is:

1. A friction clutch for a motor vehicle comprising:
    a cover having an axis of rotation;
    a pressure plate coupled to the cover for rotation therewith about the axis and having a frictional engagement surface substantially normal to the axis and having a plurality of cooling blades extending from the pressure plate on a side opposite the frictional engagement surface with the blades being located at a first radial distance from the axis;
    a biasing member interposed between the cover and the pressure plate biasing the pressure plate toward an engaged pressure plate position;
    an adjustment mechanism centered about the axis and operably disposed between the biasing member and the pressure plate, the adjustment mechanism including:
        a first annular cam rotatably fixed with respect to the pressure plate,
        a second annular cam rotatable relative to the first annular cam and both cams having a plurality of mutually engaged cam surfaces configured such that rotation of the second cam relative to the first cam in a first direction increases a height of the adjustment mechanism, and
        a torsional spring and housing assembly operably disposed between the first annular cam and the second annular cam and including:
            a torsional spring and
            a housing receiving the torsional spring and having a flange disposed
                over the blades of the pressure plate,
    wherein the flange and the blades and the side of the pressure plate opposite the frictional engagement surface in combination form radially outwardly extending air flow channels of an impeller fan which force air radially outwardly past the pressure plate when the pressure plate is rotating about the axis.

2. A friction clutch as claimed in claim 1 wherein:
    the blades each have a plateau engaged by the flange.
3. A friction clutch as claimed in claim 2 wherein the plateaus are parallel to and equally spaced from the engagement surface.
4. A friction clutch as claimed in claim 1 wherein:
    the blades are oriented at a backwards angle relative to a direction of rotation of the pressure plate.
5. A friction clutch as claimed in claim 1 wherein:
    a height of the blades is decreased at a location radially proximate to the annular cams to define air flow paths between the blades and the annular cams.
6. A friction clutch as claimed in claim 1 wherein:
    the torsion spring housing has an inner diameter portion substantially equal in diameter to an inner diameter of the pressure plate and the inner tips of the blades are located proximate to the inner diameter of the pressure plate, the resultant air flow channels being closed on all sides at an inner diameter end.
7. A clutch pressure plate comprising:
    an annular pressure plate body centered on an axis of rotation;
    a frictional engagement surface substantially normal to the axis;
    a plurality of cooling blades axially extending from the pressure plate on a side opposite the frictional engagement surface and radially extending outwardly from the inner tips located at a first radial distance from the axis, the blades being formed integral and unitary with the body;
    a plateau surface on the blades axially spaced from the pressure plate body; and
    a plurality of annularly positioned cam wedges formed integral and unitary with the pressure plate, wherein a height of the blades is decreased at a location radially proximate to the cam wedges to define air flow paths between the blades and the annular cams.
8. A clutch pressure plate comprising:
    an annular pressure plate body centered on an axis of rotation;
    a frictional engagement surface substantially normal to the axis;
    a plurality of cooling blades axially extending from the pressure plate on a side opposite the frictional engagement surface and radially extending outwardly from inner tips located at a first radial distance from the axis, the blades being formed integral and unitary with the body;
    a plateau surface on the blades axially spaced from the pressure plate body;
    a plurality of annularly positioned cam wedges formed integral and unitary with the pressure plate; and
    a height of the blades is decreased at a location radially proximate to the cam wedges to define air flow paths between the blades and the annular cams.
9. A clutch pressure plate as claimed in claim 8 wherein the plateaus are parallel to and equally spaced from the engagement surface.
10. A clutch pressure plate as claimed in claim 8 wherein the blades are oriented at a backwards angle relative to a direction of rotation of the pressure plate.

* * * * *